United States Patent
Shanahan

(10) Patent No.: US 10,055,577 B2
(45) Date of Patent: *Aug. 21, 2018

(54) TECHNOLOGIES FOR MUTUAL APPLICATION ISOLATION WITH PROCESSOR-ENFORCED SECURE ENCLAVES

(71) Applicant: Mark W. Shanahan, Raleigh, NC (US)

(72) Inventor: Mark W. Shanahan, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/083,983

(22) Filed: Mar. 29, 2016

(65) Prior Publication Data
US 2017/0286668 A1 Oct. 5, 2017

(51) Int. Cl.
*G06F 21/00* (2013.01)
*G06F 21/53* (2013.01)

(52) U.S. Cl.
CPC .................................... *G06F 21/53* (2013.01)

(58) Field of Classification Search
CPC ................................ G06F 21/53; G06F 21/50
USPC ...................................................... 726/22–25
See application file for complete search history.

(56) References Cited

U.S. PATENT DOCUMENTS

| | | |
|---|---|---|
| 2013/0198853 A1 | 8/2013 | McKeen et al. |
| 2014/0006711 A1* | 1/2014 | Xing ........................ G06F 12/10 711/118 |
| 2014/0337983 A1 | 11/2014 | Kang et al. |
| 2015/0186272 A1 | 7/2015 | Goldsmith et al. |
| 2015/0278528 A1 | 10/2015 | Xing et al. |
| 2016/0350534 A1* | 12/2016 | Poornachandran ..... G06F 21/57 |

OTHER PUBLICATIONS

International search report for PCT application No. PCT/US/2017/019636, dated Jun. 9, 2017 (3 pages).
Written opinion for PCT application No. PCT/US/2017/019636, dated Jun. 9, 2017 (8 pages).

* cited by examiner

*Primary Examiner* — Anthony Brown
(74) *Attorney, Agent, or Firm* — Barnes & Thornburg LLP

(57) ABSTRACT

Technologies for mutual application isolation include a computing device having a processor with secure enclave support. The computing device loads an application image to a memory range within a predefined virtual address range and creates a secure enclave with the predefined virtual address range assigned to the secure enclave. The computing device validates control flow integrity of the secure enclave. To validate control flow integrity the computing device may validate that the memory pages of the secure enclave synchronously exit only to an allowed address. Additionally, to validate control flow integrity the computing device may validate an asynchronous exit point associated with an enclave entry instruction. After validating the control flow integrity, the computing device executes the secure enclave, which includes enforcing mutual isolation of the application image and the secure enclave using the secure enclave support of the processor. Other embodiments are described and claimed.

25 Claims, 4 Drawing Sheets

TECHNOLOGIES FOR MUTUAL APPLICATION ISOLATION WITH PROCESSOR-ENFORCED SECURE ENCLAVES

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. The contents of an SGX secure enclave may be authenticated and therefore trusted by the independent software vendor (ISV) that provides the secure enclave. However, an SGX enclave may be capable of reading and/or writing to regular process memory and thus may not be trusted by the hosting application process or operating system.

Certain operating systems may support sandboxing for native object code. For example, Google® Native Client (NaCl) provides a mechanism for executing native object code in an isolated sandbox provided by a web browser. To ensure isolation, NaCl imposes strict limitations on the operations allowed to be performed by the native object code. In additional, NaCl does not permit code to execute within an SGX secure enclave.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
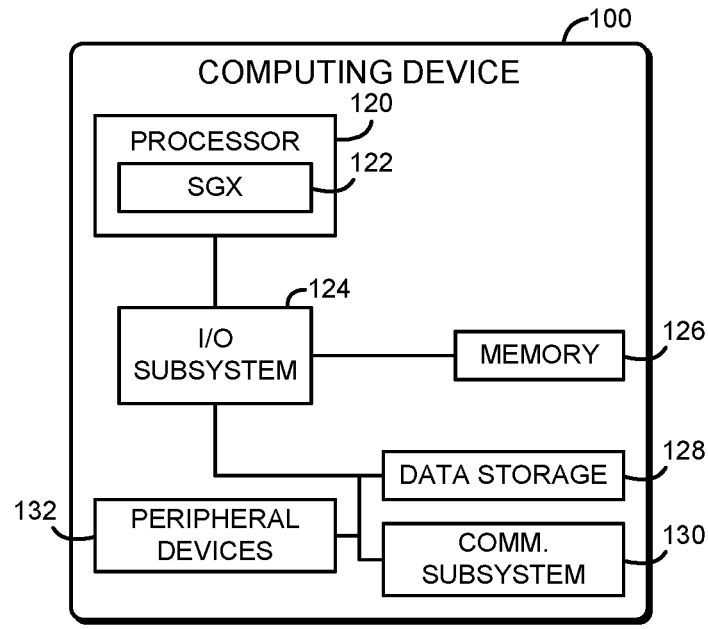
FIG. 1 is a simplified block diagram of at least one embodiment of a computing device for mutual application isolation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for mutual application isolation includes a processor 120 that supports secure enclaves (e.g., a processor 120 that supports Intel® SGX technology). In use, as described further below, the computing device 100 loads one or more application images into a predefined range of virtual memory known as a secure enclave memory range. The application images may be trusted or untrusted by the operating system of the computing device 100. The computing device 100 creates a secure enclave that is assigned the predefined secure enclave memory range. The computing device 100 validates memory pages of the secure enclave and the instructions used to enter the secure enclave to protect control flow integrity of the secure enclave. The secure enclave support of the processor 120 enforces mutual isolation between the application images and the secure enclave. Thus, the computing device 100 may securely execute enclave code provided by an independent software vendor (ISV), and the secure enclave code is isolated from application or operating system code executed by the computing device 100. Additionally, the computing device 100 protects the application and/or operating system code that hosts the secure enclave from attack by the secure enclave code. As described further below, the computing device 100 may provide mutual isolation with relatively simple validation of the secure enclave code and without imposing overly restrictive limitations on the contents of the secure enclave code. Accordingly, the computing device 100 may allow an ISV to take advantage of the security features of secure enclaves while still executing the enclave code within a sandboxed environment that is isolated from the host application and/or operating system.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes the processor 120, an input/output subsystem 124, a memory 126, a data storage device 128, and communication circuitry 130. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 126. The secure enclave support 122 may be embodied as a set of processor instruction extensions that allows the processor 120 to establish one or more secure enclaves in the memory 126. For example, the secure enclave support 122 may be embodied as Intel® Software Guard Extensions (SGX) technology.

The memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. Additionally, part of the memory 126 may be used as an enclave page cache (EPC) to store encrypted code and/or data for the secure enclaves established by the processor 120. The processor 120 may encrypt memory pages of each secure enclave before transferring the encrypted pages out of the processor 120 to the EPC within the memory 126.

The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. In some embodiments, the data storage device 128 may be used to store one or more executable binary images. Each executable binary image may include code and/or data that is to be initially loaded into a secure enclave and then measured or otherwise verified before the secure enclave is executed.

The communication circuitry 130 of the computing device 100 may be embodied as any communication circuit, device, or collection thereof, capable of enabling communications between the computing device 100 and other remote devices over a network. The communication circuitry 130 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
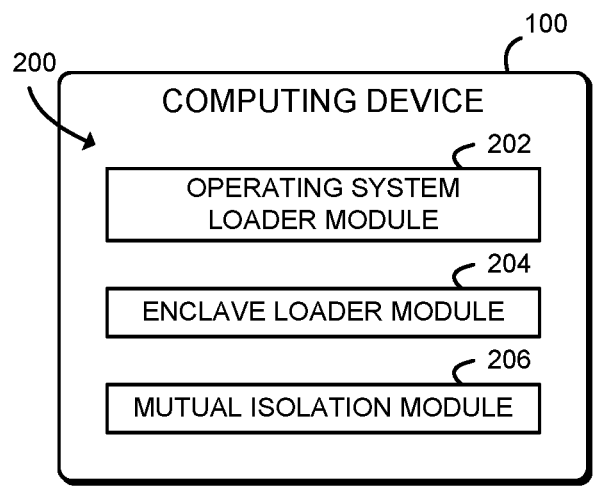
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes an operating system loader module 202, an enclave loader module 204, and a mutual isolation module 206. The various modules of the environment 200 may be embodied as hardware, firmware, software, or a combination thereof. As such, in some embodiments, one or more of the modules of the environment 200 may be embodied as circuitry or collection of electrical devices (e.g., operating system loader circuitry 202, enclave loader circuitry 204, and/or mutual isolation circuitry 206). It should be appreciated that, in such embodiments, one or more of the operating system loader circuitry 202, the enclave loader circuitry 204, and/or the mutual isolation circuitry 206 may form a portion of one or more of the processor 120, the I/O subsystem 124, and/or other components of the computing device 100. Additionally, in some embodiments, one or more of the illustrative modules may form a portion of another module and/or one or more of the illustrative modules may be independent of one another.

The operating system loader module 202 is configured to load an application image to a memory range within a predefined virtual address range. The operating system loader module 202 may be further configured to verify that the application image is an operating-system trusted application image and execute the application image in response to verification that the application image is an operating-system-trusted application image. The operating system loader module 202 may be configured to load an untrusted application image that is not trusted by an operating system of the computing device 100. The operating system loader module 202 may be further configured to execute the untrusted application image within a sandbox established by the operating system.

The enclave loader module 204 is configured to create a secure enclave with the predefined virtual address range assigned to the secure enclave. The enclave loader module 204 is further configured to validate control flow integrity of the secure enclave in response to creating the secure enclave. Validating the control flow integrity of the secure enclave may include validating secure enclave memory pages to ensure that the secure enclave exits to an allowed address and/or verifying that each executable secure enclave memory page is not writable. The enclave loader module 204 may be further configured to add the secure enclave memory pages to an enclave page cache in response to validating the secure enclave memory pages and initialize the secure enclave in response to adding the secure enclave memory pages. The enclave page cache is included within the predefined virtual address range. Validating the control flow integrity of the secure enclave may also include validating an asynchronous exit point associated with an enclave entry instruction. The enclave loader module 204 may be further configured to enter the secure enclave in response to validating the control flow integrity of the secure enclave.

The mutual isolation module 206 is configured to execute the secure enclave in response to validating the control flow integrity of the secure enclave. Executing the secure enclave includes enforcing mutual isolation of the secure enclave and the application image using the secure enclave support 122 of the processor 120. Enforcing mutual isolation may include generating abort transaction semantics by the processor 120 in response to a memory access from the application image into the enclave secure enclave or generating a fault by the processor 120 in response to a memory access from the secure enclave into the application image. The mutual isolation module 206 may be further configured to share data stored in an untrusted memory buffer between the application image and the secure enclave. The untrusted memory buffer is located outside of the predefined virtual address range.

Figure 3:
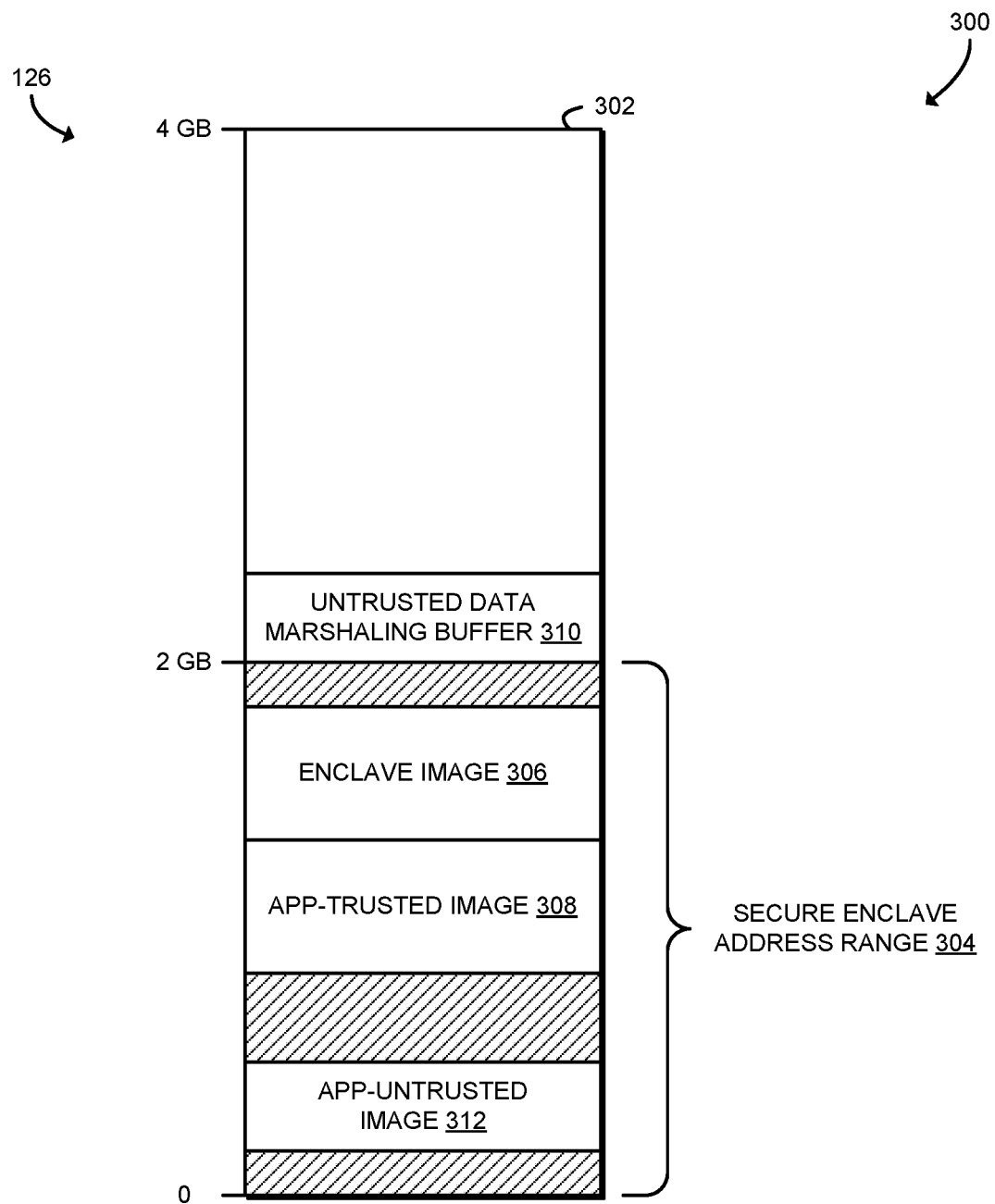
FIG. 3 is a schematic diagram illustrating a virtual address space that may be established by the computing device of FIGS. 1-2.

Referring now to FIG. 3, schematic diagram 300 illustrates a virtual memory address space 302 that may be established by the computing device 100. The virtual memory address space 302 includes a contiguous range of linear memory addresses (also called virtual addresses) that may be addressed by one or more programs executed the computing device 100. The computing device 100 translates between virtual addresses in the virtual memory address space 302 to physical memory pages in the memory 126, using one or more page tables managed by the processor 120 and operating system software. As shown, the virtual memory address space 302 is a 32-bit range capable of addressing 4 gigabytes of memory 126. However, it should be understood that in some embodiments the virtual memory address space 302 may have a different size (e.g., a 64-bit range).

The virtual memory address space 302 includes a secure enclave address range 304, which is illustratively located in the lower half of the virtual memory address space 302. The secure enclave address range 304 may include code and/or data used by programs executed by the computing device 100, including an enclave image 306 and an application-trusted image 308. The enclave image 306 corresponds to code and/or data memory pages included in a secure enclave. The contents of the enclave image 306 are added to an enclave page cache, which is encrypted and otherwise protected from unauthorized access by the secure enclave support 122 of the processor 120. The application-trusted image 308 corresponds to code and/or data that has been verified or is otherwise trusted by application software (or operating-system level software) executed by the computing device 100. As described further below, the enclave image 306 and the application-trusted image 308 are mutually isolated by the processor 120, meaning that code executing from the enclave image 306 cannot access the application-trusted image 308 and vice versa. In some embodiments, the enclave image 306 and the application-trusted image 308 may communicate through an untrusted data marshaling buffer 310 that is positioned in the virtual memory address space 302 outside of the secure enclave address range 304. Additionally or alternatively, in some embodiments the secure enclave address range 304 may also include an application-untrusted image 312. The application-untrusted image 312 may be code and/or data that is not trusted by the application software or the operating-system level software, such as a downloaded applet, plug-in, library, or other untrusted code. The enclave image 306 and the application-untrusted image 312 are also mutually isolated by the processor 120.

Figure 4A:
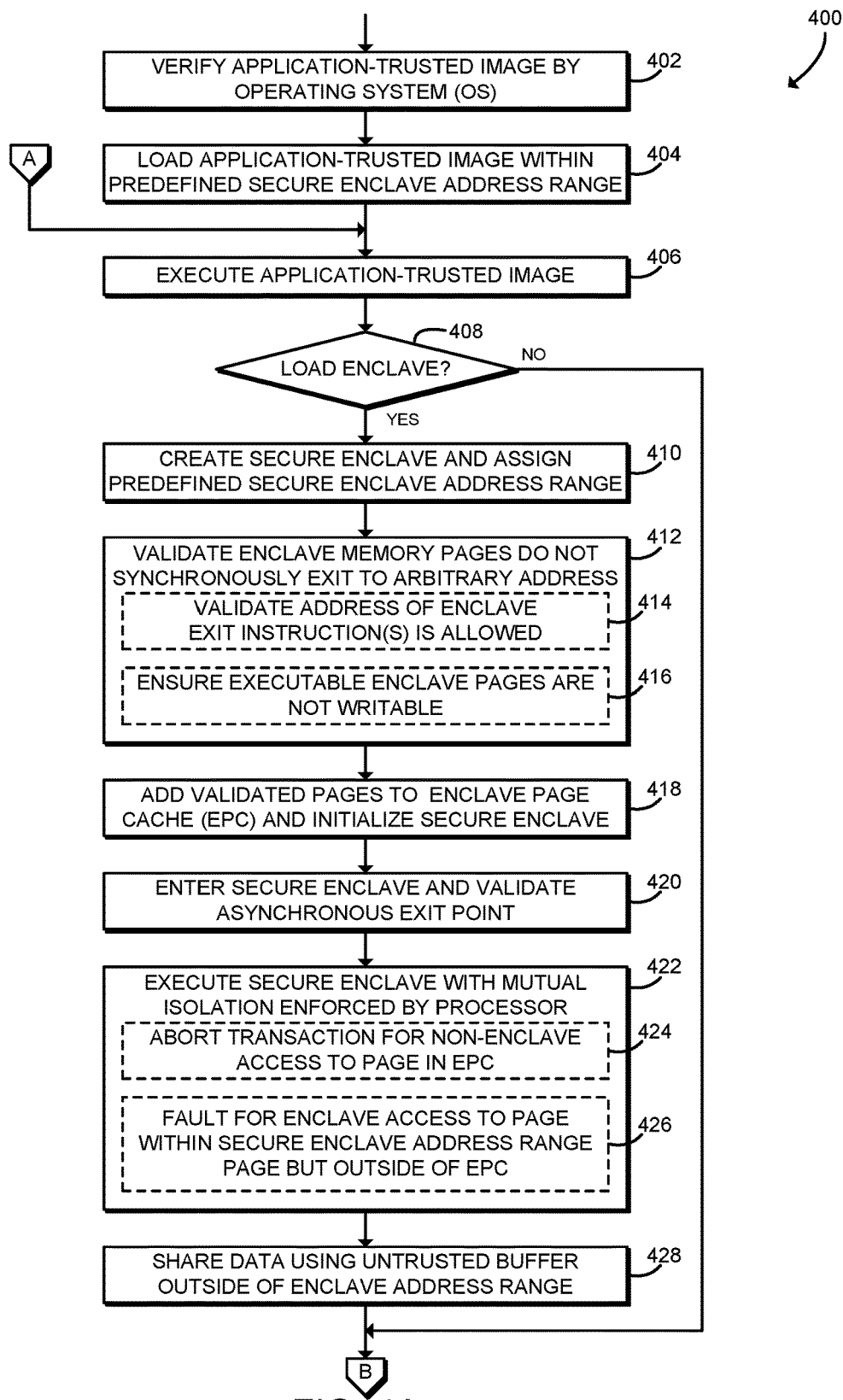
FIGS. 4A and 4B are a simplified flow diagram of at least one embodiment of a method for mutual application isolation that may be executed by the computing device of FIGS. 1-2.
Figure 4B:
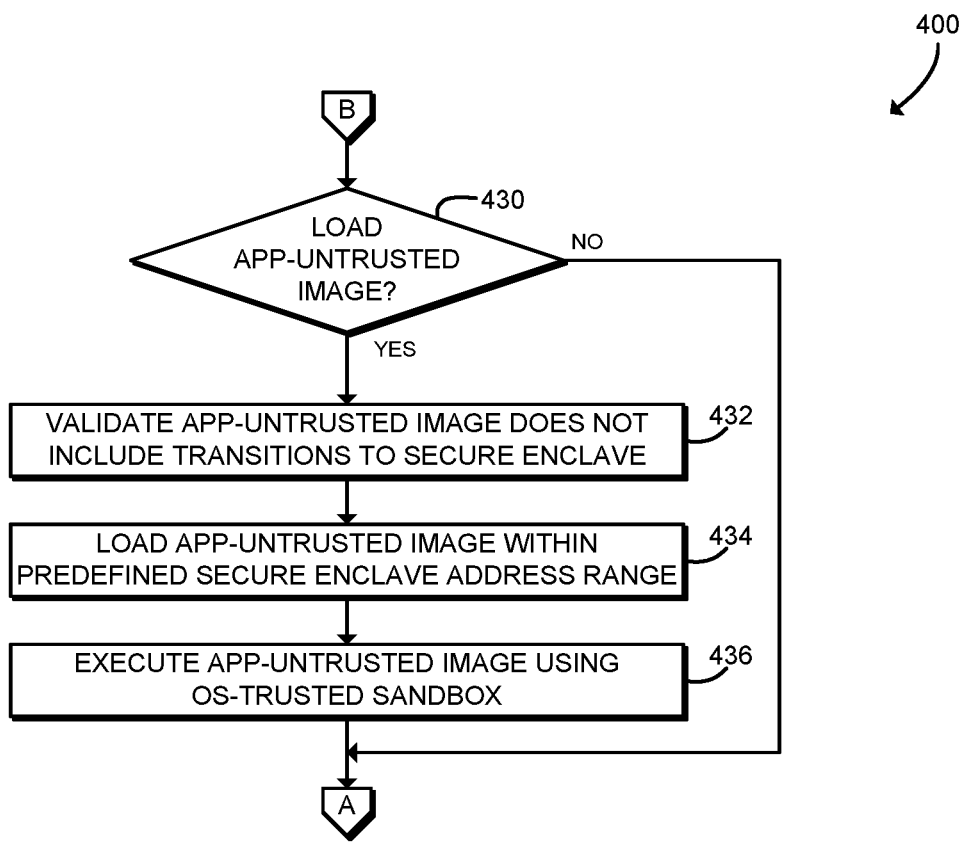

Referring now to FIGS. 4A and 4B, in use, the computing device 100 may execute a method 400 for mutual application isolation. The method 400 begins in block 402, in which the computing device 100 verifies an application-trusted image 308 by an operating system of the computing device 100. The application-trusted image 308 may be embodied as any executable application, library, or other native object code module that may be executed by the computing device 100. For example, the application-trusted image 308 may be embodied as an interactive application such as a web browser or an applet, plug-in, library, or other code module that may be embedded by an interactive application. The computing device 100 may use any technique to authenticate or otherwise verify the contents of the application-trusted image 308. For example, an operating system loader or virtual machine monitor (VMM) of the computing device 100 may measure and verify the application-trusted image 308. After being verified, the application-trusted image 308 is deemed to be trusted by the operating system of the computing device 100.

In block 404, the computing device 100 loads the application-trusted image 308 within the predefined secure enclave address range 304. For example, a dynamic loader of the computing device 100 may load the application-trusted image 308 into a range of the virtual memory address space 302 that is included within the secure enclave address range 304. In the illustrative embodiment, as shown in FIG. 3, the computing device 100 may load the application-trusted image 308 into the lower half of the virtual memory address space 302. Although located within the secure enclave address range 304, the application-trusted image 308 is not loaded into an enclave page cache (EPC) and thus is not encrypted, integrity-protected, or confidentiality-protected by the secure enclave support 122 of the processor 120.

In block 406, the computing device 100 executes the application-trusted image 308. For example, the computing device 100 may execute interactive application code included in the application-trusted image 308. During execution, the application-trusted image 308 (or an associated host application) may attempt to load a secure enclave. For example, the computing device 100 may download or otherwise install a new secure enclave and attempt to load and execute that secure enclave. In block 408, the computing device 100 determines whether to load a secure enclave. If not, the method 400 branches ahead to block 430, shown in FIG. 4B. If the computing device 100 determines to load a secure enclave, the method 400 advances to block 410.

In block 410, the computing device 100 creates a secure enclave and assigns the predefined secure enclave address range 304 to the newly created secure enclave. The computing device 100 creates the secure enclave using the secure enclave support 122 of the processor 120. For example, certain processors 120 supporting Intel SGX technology may support one or more processor instructions with multiple associated leaf functions. In particular, the processor 120 may support an ENCLS system-level instruction and an ENCLU user-level instruction. In those embodiments, to create the secure enclave the computing device 100 executes the ENCLS[ECREATE] leaf function. To improve clarity, in this disclosure SGX leaf functions may be referred to as instructions using the mnemonic of the corresponding leaf function (e.g., ENCLS[ECREATE] may be referred to as the ECREATE instruction). The computing device 100 may set the ELRANGE of the newly created secure enclave to correspond to the predefined secure enclave address range 304 (for example, by specifying a base address and size of the secure enclave when creating the secure enclave). The secure enclave is created in an uninitialized state, and when first created the enclave page cache (EPC) does not include any pages for the secure enclave.

In block 412, the computing device 100 validates that secure enclave memory pages to be added to the secure enclave do not synchronously exit to arbitrary memory addresses. Validating that the memory pages do not synchronously exit to arbitrary memory addresses is part of protecting the control flow integrity of the secure enclave. The secure enclave support 122 of the processor 120 may support well-defined control flow mechanisms. For example, a secure enclave may only be exited by a synchronous enclave exit instruction EEXIT (ENCLU[EEXIT]) or by an asynchronous exit (described further below in connection with block 420). To validate that the memory pages do not include a synchronous exit to arbitrary memory addresses, the computing device 100 may statically analyze the contents of the enclave memory pages, for example by disassembling object code included in the memory pages. In some embodiments, in block 414 the computing device 100 may validate that the exit address of any enclave exit instruction in the enclave memory page is allowed. For example, the computing device 100 may validate that the exit address of each EEXIT instruction points to a predefined address within the virtual memory address space 302 or to a predefined offset relative to the base of the secure enclave image 306. An exit trampoline or other trusted code may be located at those allowed addresses. In some embodiments, in block 416, the computing device 100 may ensure that executable secure enclave memory pages are not writable. Preventing executable and writable pages may prevent self-modifying enclave code from generating EEXIT instructions that exit to arbitrary addresses.

In block 418, the computing device 100 adds the validated pages to the enclave page cache (EPC) and then initializes the secure enclave. For example, the computing device 100 may execute the EADD instruction (ENCLS[EADD]) or the EAUG instruction (ENCLS[EAUG]) to add each page to the EPC. The computing device 100 may add the validated pages at a predefined offset within the secure enclave address range 304. Adding the page to the EPC may also update a measurement of the secure enclave. The enclave may be initialized by executing the EINIT instruction (ENCLS[EINIT]), which finalizes the measurement of the secure enclave. The measurement of the secure enclave may be verified, for example by checking against a signature provided by the ISV that produced the secure enclave. Thus, after being loaded and initialized, the secure enclave is deemed to be trusted by the ISV (or other party trusted by the ISV).

In block 420, the computing device 100 enters the secure enclave and validates an asynchronous exit point (AEP) for the secure enclave. The computing device 100 may execute the EENTER instruction (ENCLU[EENTER]) to enter the secure enclave. The computing device 100 supplies an address for the AEP with the EENTER instruction. During execution of the secure enclave, the processor 120 may generate an asynchronous exit in response to an interrupt or exception. In response to the asynchronous exit, the processor 120 stores thread state within the secure enclave (including the current instruction pointer) and then jumps to the address of the AEP. Because the thread state is stored within the secure enclave, code executing outside of the secure enclave (e.g., the application-trusted image 308) may not access that thread state. The computing device 100 may validate the AEP by, for example, determining that the AEP points to an address of application-trusted code such as an exception handler, interrupt handler, or other trusted asynchronous exit handler. In some embodiments, the computing device 100 may verify that the code pointed to by the AEP ends with an enclave resume instruction such as ERESUME (ENCLU[ERESUME]). In response to executing the ERESUME instruction, the processor 120 re-enters the secure enclave and uses the stored thread state to resume execution.

In block 422, the computing device 100 executes the secure enclave with mutual isolation from application code enforced by the secure enclave support 122 of the processor 120. The particular techniques for enforcing mutual isolation may depend on the particular memory accesses encountered at runtime. In some embodiments, in block 424 the computing device 100 may abort the transaction for a non-enclave memory access to a memory page within the enclave page cache. For example, a memory access from the application-trusted image 308 and/or the application-untrusted image 312 to a page within the enclave image 306 may be aborted. To abort the transaction, the processor 120 may generate page abort semantics. The particular page abort semantics are undefined and may depend on the particular model of the processor 120. For example, in some embodiments the processor 120 may return an abort page with all bits set to the logical value "1." Aborting the page prevents the application-trusted image 308 and/or the application-untrusted image 312 from accessing the contents of the enclave image 306.

In some embodiments, in block 426 the computing device 100 may generate a fault for an enclave access to a page that is within the secure enclave address range 304 but outside of the enclave page cache. For example, a memory access from the enclave image 306 to a page within the application-trusted image 308 and/or the application-untrusted image 312 may generate a page fault. The page fault may prevent the secure enclave image 306 from accessing the contents of the application-trusted image 308 or the application-untrusted image 312.

In block 428, the computing device 100 may share data between the secure enclave and application code executing outside of the secure enclave using an untrusted buffer outside of the secure enclave address range 304. For example, the computing device 100 may access shared data in the untrusted data marshaling buffer 310. The computing device 100 may use any technique for marshaling the data in the buffer 310. For example, in some embodiments, the secure enclave image 306 may establish a transitional stack in the buffer 310 to pass data to the application-trusted image 308. After loading and executing the secure enclave, the method 400 advances to block 430, shown in FIG. 4B.

In block 430, the computing device 100 determines whether to load an application-untrusted image 312. During execution, the secure enclave image 306, the application-trusted image 308, and/or other code executed by the computing device 100 may attempt to load an application-untrusted image 312. For example, the computing device 100 may attempt to load an application executable, library, plug-in, applet, or other code module that is not trusted by the operating system of the computing device 100. If the computing device 100 determines not to load the application-untrusted image 312, the method 400 loops back to block 406, shown in FIG. 4A, to continue executing the application-trusted image 308 and/or the secure enclave image 306 with mutual isolation. If the computing device 100 determines to load the application-untrusted image 312, the method 400 advances to block 432.

In block 432, the computing device 100 validates that the application-untrusted image 312 does not include transitions to a secure enclave. Validating the application-untrusted image 312 may protect the control flow integrity of the secure enclave image 306 by preventing unauthorized entry into the secure enclave image 306. As described above, the secure enclave support 122 of the processor 120 may support well-defined control flow mechanisms. For example, a secure enclave may only be entered by an enclave enter instruction EENTER (ENCLU[EENTER]). Jumps directly to locations within the secure enclave image 306 may generate abort page semantics, as described above in connection with block 422. To validate that the application-untrusted image 312 does not include EENTER instructions, the computing device 100 may statically analyze the contents of the application-untrusted image 312, for example by disassembling the application-untrusted image 312.

In block 434, the computing device 100 loads the application-untrusted image 312 within the predefined secure enclave address range 304. For example, a dynamic loader of the computing device 100 may load the application-untrusted image 312 into a range of the virtual memory address space 302 that is included within the secure enclave address range 304. In the illustrative embodiment, as shown in FIG. 3, the computing device 100 may load the application-untrusted image 312 into the lower half of the virtual memory address space 302. Although located within the secure enclave address range 304, the application-untrusted image 312 is not loaded into an enclave page cache (EPC) and is thus not encrypted, integrity-protected, or confidentiality-protected by the secure enclave support 122 of the processor 120.

In block 436, the computing device 100 executes the application-untrusted image 312 using an operating-system-trusted sandbox. The sandbox isolates the application-untrusted image 312 from other application code such as the application-trusted image 308. The sandbox is not required to isolate the application-untrusted image 312 from the enclave image 306; as described above in connection with block 422 shown in FIG. 4A, the secure enclave support 122 of the processor 120 enforces isolation between the secure enclave image 306 and application code such as the application-untrusted image 312. After starting execution of the application-untrusted image 312, the method 400 loops back to block 406, shown in FIG. 4A, to continue executing the application-trusted image 308, the application-untrusted image 312, and/or the secure enclave image 306 with mutual isolation.

It should be appreciated that, in some embodiments, the method 400 may be embodied as various instructions stored on a computer-readable media, which may be executed by the processor 120, the I/O subsystem 124, and/or other components of the computing device 100 to cause the computing device 100 to perform the method 400. The computer-readable media may be embodied as any type of media capable of being read by the computing device 100 including, but not limited to, the memory 126, the data storage device 128, firmware devices, and/or other media.

EXAMPLES

Illustrative examples of the technologies disclosed herein are provided below. An embodiment of the technologies may include any one or more, and any combination of, the examples described below.

Example 1 includes a computing device for mutual application isolation, the computing device comprising a processor with secure enclave support; an operating system loader module to load an application image to a memory range within a predefined virtual address range; an enclave loader module to (i) create a secure enclave, wherein the predefined virtual address range is assigned to the secure enclave and (ii) validate control flow integrity of the secure enclave in response to creation of the secure enclave; and a mutual isolation module to execute the secure enclave in response to validation of the control flow integrity of the secure enclave, wherein to execute the secure enclave comprises to enforce mutual isolation of the secure enclave and the application image with the secure enclave support of the processor.

Example 2 includes the subject matter of Example 1, and wherein to enforce mutual isolation of the secure enclave and the application image comprises to generate abort transaction semantics by the processor in response to a memory access from the application image into the enclave secure enclave.

Example 3 includes the subject matter of any of Examples 1 and 2, and wherein to enforce mutual isolation of the secure enclave and the application image comprises to generate a fault by the processor in response to a memory access from the secure enclave into the application image.

Example 4 includes the subject matter of any of Examples 1-3, and wherein to validate the control flow integrity of the secure enclave comprises to validate one or more secure enclave memory pages associated with the secure enclave to ensure that the secure enclave synchronously exits to an allowed address.

Example 5 includes the subject matter of any of Examples 1-4, and wherein to validate the one or more secure enclave memory pages comprises to statically analyze the one or more secure enclave memory pages.

Example 6 includes the subject matter of any of Examples 1-5, and wherein to validate the one or more secure enclave memory pages further comprises to validate that an exit address associated with an enclave exit instruction is an allowed address.

Example 7 includes the subject matter of any of Examples 1-6, and wherein to validate that the exit address associated with the enclave exit instruction is an allowed address comprises to determine whether the exit address is at a predefined address within the application image or to determine whether the exit address is at a predefined offset from a base address of the secure enclave.

Example 8 includes the subject matter of any of Examples 1-7, and wherein to validate the one or more secure enclave memory pages comprises to verify that each executable secure enclave memory page is not writable.

Example 9 includes the subject matter of any of Examples 1-8, and wherein the enclave loader module is further to add the one or more secure enclave memory pages to an enclave page cache in response to validation of the one or more secure enclave memory pages, wherein the enclave page cache is included within the predefined virtual address range; and initialize the secure enclave in response to addition of the one or more secure enclave memory pages to the enclave page cache, wherein to initialize the secure enclave comprises to measure and verify the secure enclave.

Example 10 includes the subject matter of any of Examples 1-9, and wherein to add the one or more secure enclave memory pages to the enclave page cache comprises to add the memory pages at a predefined offset within the predefined virtual address range.

Example 11 includes the subject matter of any of Examples 1-10, and wherein to validate the control flow integrity of the secure enclave comprises to validate an asynchronous exit point associated with an enclave entry instruction.

Example 12 includes the subject matter of any of Examples 1-11, and wherein to validate the asynchronous exit point associated with the enclave entry instruction comprises to determine whether the asynchronous exit point is associated with a code segment of the application image that ends with an enclave resume instruction.

Example 13 includes the subject matter of any of Examples 1-12, and wherein the operating system loader module is further to (i) verify that the application image is an operating-system trusted application image and (ii) execute the application image in response to verification that the application image is an operating-system-trusted application image; the enclave loader module is further to enter the secure enclave in response to the validation of the control flow integrity of the secure enclave; and to validate the asynchronous exit point associated with the enclave entry instruction comprises to validate the asynchronous exit point associated with an enclave entry instruction of the application image in response to execution of the application image.

Example 14 includes the subject matter of any of Examples 1-13, and wherein the mutual isolation module is further to share data stored in an untrusted memory buffer between the application image and the secure enclave, wherein the untrusted memory buffer is located outside of the predefined virtual address range.

Example 15 includes the subject matter of any of Examples 1-14, and wherein to share the data stored in the untrusted memory buffer comprises to write the data by the secure enclave and to read the data by the application image.

Example 16 includes the subject matter of any of Examples 1-15, and wherein to share the data stored in the untrusted memory buffer comprises to write the data by the application image and to read the data by the secure enclave.

Example 17 includes the subject matter of any of Examples 1-16, and wherein to load the application image comprises to load an untrusted application image that is not trusted by an operating system of the computing device; and to validate the control flow integrity of the secure enclave comprises to validate that the untrusted application image does not include an enclave entry instruction.

Example 18 includes the subject matter of any of Examples 1-17, and wherein the operating system loader module is further to execute the untrusted application image within a sandbox established by the operating system in response to loading of the untrusted application image.

Example 19 includes a method for mutual application isolation, the method comprising loading, by a computing device, an application image to a memory range within a predefined virtual address range; creating, by the computing device, a secure enclave, wherein the predefined virtual address range is assigned to the secure enclave; validating, by the computing device, control flow integrity of the secure enclave in response to creating the secure enclave; and executing, by the computing device, the secure enclave in response to validating the control flow integrity of the secure enclave, wherein executing the secure enclave comprises enforcing mutual isolation of the secure enclave and the application image with secure enclave support of a processor of the computing device.

Example 20 includes the subject matter of Example 19, and wherein enforcing mutual isolation of the secure enclave and the application image comprises generating abort transaction semantics by the processor in response to a memory access from the application image into the enclave secure enclave.

Example 21 includes the subject matter of any of Examples 19 and 20, and wherein enforcing mutual isolation of the secure enclave and the application image comprises generating a fault by the processor in response to a memory access from the secure enclave into the application image.

Example 22 includes the subject matter of any of Examples 19-21, and wherein validating the control flow integrity of the secure enclave comprises validating one or more secure enclave memory pages associated with the secure enclave to ensure that the secure enclave synchronously exits to an allowed address.

Example 23 includes the subject matter of any of Examples 19-22, and wherein validating the one or more secure enclave memory pages comprises statically analyzing the one or more secure enclave memory pages.

Example 24 includes the subject matter of any of Examples 19-23, and wherein validating the one or more secure enclave memory pages further comprises validating that an exit address associated with an enclave exit instruction is an allowed address.

Example 25 includes the subject matter of any of Examples 19-24, and wherein validating that the exit address associated with the enclave exit instruction is an allowed address comprises determining whether the exit address is at a predefined address within the application image or determining whether the exit address is at a predefined offset from a base address of the secure enclave.

Example 26 includes the subject matter of any of Examples 19-25, and wherein validating the one or more secure enclave memory pages comprises verifying that each executable secure enclave memory page is not writable.

Example 27 includes the subject matter of any of Examples 19-26, and further comprising adding, by the computing device, the one or more secure enclave memory pages to an enclave page cache in response to validating the one or more secure enclave memory pages, wherein the enclave page cache is included within the predefined virtual address range; and initializing, by the computing device, the secure enclave in response to adding the one or more secure enclave memory pages to the enclave page cache, wherein initializing the secure enclave comprises measuring and verifying the secure enclave.

Example 28 includes the subject matter of any of Examples 19-27, and wherein adding the one or more secure enclave memory pages to the enclave page cache comprises adding the memory pages at a predefined offset within the predefined virtual address range.

Example 29 includes the subject matter of any of Examples 19-28, and wherein validating the control flow integrity of the secure enclave comprises validating an asynchronous exit point associated with an enclave entry instruction.

Example 30 includes the subject matter of any of Examples 19-29, and wherein validating the asynchronous exit point associated with the enclave entry instruction comprises determining whether the asynchronous exit point is associated with a code segment of the application image that ends with an enclave resume instruction.

Example 31 includes the subject matter of any of Examples 19-30, and further comprising verifying, by the computing device, that the application image is an operating-system trusted application image; executing, by the computing device, the application image in response to verifying that the application image is an operating-system-trusted application image; and entering, by the computing device, the secure enclave in response to validating the control flow integrity of the secure enclave; wherein validating the asynchronous exit point associated with the enclave entry instruction comprises validating the asynchronous exit point associated with an enclave entry instruction of the application image in response to executing the application image.

Example 32 includes the subject matter of any of Examples 19-31, and further comprising sharing, by the computing device, data stored in an untrusted memory buffer between the application image and the secure enclave, wherein the untrusted memory buffer is located outside of the predefined virtual address range.

Example 33 includes the subject matter of any of Examples 19-32, and wherein sharing the data stored in the untrusted memory buffer comprises writing the data by the secure enclave and reading the data by the application image.

Example 34 includes the subject matter of any of Examples 19-33, and wherein sharing the data stored in the untrusted memory buffer comprises writing the data by the application image and reading the data by the secure enclave.

Example 35 includes the subject matter of any of Examples 19-34, and wherein loading the application image comprises loading an untrusted application image that is not trusted by an operating system of the computing device; and validating the control flow integrity of the secure enclave comprises validating that the untrusted application image does not include an enclave entry instruction.

Example 36 includes the subject matter of any of Examples 19-35, and further comprising executing, by the computing device, the untrusted application image within a sandbox established by the operating system in response to loading the untrusted application image.

Example 37 includes a computing device comprising a processor; and a memory having stored therein a plurality of instructions that when executed by the processor cause the computing device to perform the method of any of Examples 19-36.

Example 38 includes one or more machine readable storage media comprising a plurality of instructions stored thereon that in response to being executed result in a computing device performing the method of any of Examples 19-36.

Example 39 includes a computing device comprising means for performing the method of any of Examples 19-36.

Example 40 includes a computing device for mutual application isolation, the computing device comprising means for loading an application image to a memory range within a predefined virtual address range; means for creating a secure enclave, wherein the predefined virtual address range is assigned to the secure enclave; means for validating control flow integrity of the secure enclave in response to creating the secure enclave; and means for executing the secure enclave in response to validating the control flow integrity of the secure enclave, wherein the means for executing the secure enclave comprises means for enforcing mutual isolation of the secure enclave and the application image with secure enclave support of a processor of the computing device.

Example 41 includes the subject matter of Example 40, and wherein the means for enforcing mutual isolation of the secure enclave and the application image comprises means for generating abort transaction semantics by the processor in response to a memory access from the application image into the enclave secure enclave.

Example 42 includes the subject matter of any of Examples 40 and 41, and wherein the means for enforcing mutual isolation of the secure enclave and the application image comprises means for generating a fault by the processor in response to a memory access from the secure enclave into the application image.

Example 43 includes the subject matter of any of Examples 40-42, and wherein the means for validating the control flow integrity of the secure enclave comprises means for validating one or more secure enclave memory pages associated with the secure enclave to ensure that the secure enclave synchronously exits to an allowed address.

Example 44 includes the subject matter of any of Examples 40-43, and wherein the means for validating the one or more secure enclave memory pages comprises means for statically analyzing the one or more secure enclave memory pages.

Example 45 includes the subject matter of any of Examples 40-44, and wherein the means for validating the one or more secure enclave memory pages further comprises means for validating that an exit address associated with an enclave exit instruction is an allowed address.

Example 46 includes the subject matter of any of Examples 40-45, and wherein the means for validating that the exit address associated with the enclave exit instruction is an allowed address comprises means for determining whether the exit address is at a predefined address within the application image or determining whether the exit address is at a predefined offset from a base address of the secure enclave.

Example 47 includes the subject matter of any of Examples 40-46, and wherein the means for validating the one or more secure enclave memory pages comprises means for verifying that each executable secure enclave memory page is not writable.

Example 48 includes the subject matter of any of Examples 40-47, and further comprising means for adding the one or more secure enclave memory pages to an enclave page cache in response to validating the one or more secure enclave memory pages, wherein the enclave page cache is included within the predefined virtual address range; and means for initializing the secure enclave in response to adding the one or more secure enclave memory pages to the enclave page cache, wherein initializing the secure enclave comprises measuring and verifying the secure enclave.

Example 49 includes the subject matter of any of Examples 40-48, and wherein the means for adding the one or more secure enclave memory pages to the enclave page cache comprises means for adding the memory pages at a predefined offset within the predefined virtual address range.

Example 50 includes the subject matter of any of Examples 40-49, and wherein the means for validating the control flow integrity of the secure enclave comprises means for validating an asynchronous exit point associated with an enclave entry instruction.

Example 51 includes the subject matter of any of Examples 40-50, and wherein the means for validating the asynchronous exit point associated with the enclave entry instruction comprises means for determining whether the asynchronous exit point is associated with a code segment of the application image that ends with an enclave resume instruction.

Example 52 includes the subject matter of any of Examples 40-51, and further comprising means for verifying that the application image is an operating-system trusted application image; means for executing the application image in response to verifying that the application image is an operating-system-trusted application image; and means for entering the secure enclave in response to validating the control flow integrity of the secure enclave; wherein the means for validating the asynchronous exit point associated with the enclave entry instruction comprises means for validating the asynchronous exit point associated with an enclave entry instruction of the application image in response to executing the application image.

Example 53 includes the subject matter of any of Examples 40-52, and further comprising means for sharing data stored in an untrusted memory buffer between the application image and the secure enclave, wherein the untrusted memory buffer is located outside of the predefined virtual address range.

Example 54 includes the subject matter of any of Examples 40-53, and wherein the means for sharing the data stored in the untrusted memory buffer comprises means for writing the data by the secure enclave and reading the data by the application image.

Example 55 includes the subject matter of any of Examples 40-54, and wherein the means for sharing the data stored in the untrusted memory buffer comprises means for writing the data by the application image and reading the data by the secure enclave.

Example 56 includes the subject matter of any of Examples 40-55, and wherein the means for loading the application image comprises means for loading an untrusted application image that is not trusted by an operating system of the computing device; and the means for validating the control flow integrity of the secure enclave comprises means for validating that the untrusted application image does not include an enclave entry instruction.

Example 57 includes the subject matter of any of Examples 40-56, and further comprising means for executing the untrusted application image within a sandbox established by the operating system in response to loading the untrusted application image.

The invention claimed is:

1. A computing device for mutual application isolation, the computing device comprising:
a processor with secure enclave support;
an operating system loader module to load an application image to a memory range within a predefined virtual address range;
an enclave loader module to (i) create a secure enclave, wherein the predefined virtual address range is assigned to the secure enclave and (ii) validate control flow integrity of the secure enclave in response to creation of the secure enclave; and
a mutual isolation module to execute the secure enclave in response to validation of the control flow integrity of the secure enclave, wherein to execute the secure enclave comprises to enforce mutual isolation of the secure enclave and the application image with the secure enclave support of the processor.

2. The computing device of claim 1, wherein to enforce mutual isolation of the secure enclave and the application image comprises to generate abort transaction semantics by the processor in response to a memory access from the application image into the enclave secure enclave.

3. The computing device of claim 1, wherein to enforce mutual isolation of the secure enclave and the application image comprises to generate a fault by the processor in response to a memory access from the secure enclave into the application image.

4. The computing device of claim 1, wherein to validate the control flow integrity of the secure enclave comprises to validate one or more secure enclave memory pages associated with the secure enclave to ensure that the secure enclave synchronously exits to an allowed address.

5. The computing device of claim 4, wherein to validate the one or more secure enclave memory pages comprises to statically analyze the one or more secure enclave memory pages.

6. The computing device of claim 5, wherein to validate the one or more secure enclave memory pages further comprises to validate that an exit address associated with an enclave exit instruction is an allowed address.

7. The computing device of claim 6, wherein to validate that the exit address associated with the enclave exit instruction is an allowed address comprises to determine whether the exit address is at a predefined address within the application image or to determine whether the exit address is at a predefined offset from a base address of the secure enclave.

8. The computing device of claim 4, wherein to validate the one or more secure enclave memory pages comprises to verify that each executable secure enclave memory page is not writable.

9. The computing device of claim 1, wherein to validate the control flow integrity of the secure enclave comprises to validate an asynchronous exit point associated with an enclave entry instruction.

10. The computing device of claim 9, wherein to validate the asynchronous exit point associated with the enclave entry instruction comprises to determine whether the asynchronous exit point is associated with a code segment of the application image that ends with an enclave resume instruction.

11. The computing device of claim 1, wherein the mutual isolation module is further to share data stored in an untrusted memory buffer between the application image and the secure enclave, wherein the untrusted memory buffer is located outside of the predefined virtual address range.

12. The computing device of claim 1, wherein:

to load the application image comprises to load an untrusted application image that is not trusted by an operating system of the computing device; and to validate the control flow integrity of the secure enclave comprises to validate that the untrusted application image does not include an enclave entry instruction.

13. The computing device of claim 12, wherein the operating system loader module is further to execute the untrusted application image within a sandbox established by the operating system in response to loading of the untrusted application image.

14. A method for mutual application isolation, the method comprising:

loading, by a computing device, an application image to a memory range within a predefined virtual address range;

creating, by the computing device, a secure enclave, wherein the predefined virtual address range is assigned to the secure enclave;

validating, by the computing device, control flow integrity of the secure enclave in response to creating the secure enclave; and executing, by the computing device, the secure enclave in response to validating the control flow integrity of the secure enclave, wherein executing the secure enclave comprises enforcing mutual isolation of the secure enclave and the application image with secure enclave support of a processor of the computing device.

15. The method of claim 14, wherein validating the control flow integrity of the secure enclave comprises validating one or more secure enclave memory pages associated with the secure enclave to ensure that the secure enclave synchronously exits to an allowed address.

16. The method of claim 15, wherein validating the one or more secure enclave memory pages comprises verifying that each executable secure enclave memory page is not writable.

17. The method of claim 14, wherein validating the control flow integrity of the secure enclave comprises validating an asynchronous exit point associated with an enclave entry instruction.

18. The method of claim 14, wherein:

loading the application image comprises loading an untrusted application image that is not trusted by an operating system of the computing device; and validating the control flow integrity of the secure enclave comprises validating that the untrusted application image does not include an enclave entry instruction.

19. One or more non-transitory, computer-readable storage media comprising a plurality of instructions that in response to being executed cause a computing device to:

load an application image to a memory range within a predefined virtual address range;

create a secure enclave, wherein the predefined virtual address range is assigned to the secure enclave;

validate control flow integrity of the secure enclave in response to creating the secure enclave; and execute the secure enclave in response to validating the control flow integrity of the secure enclave, wherein executing the secure enclave comprises enforcing mutual isolation of the secure enclave and the application image with secure enclave support of a processor of the computing device.

20. The one or more non-transitory, computer-readable storage media of claim 19, wherein to validate the control flow integrity of the secure enclave comprises to validate one or more secure enclave memory pages associated with the secure enclave to ensure that the secure enclave synchronously exits to an allowed address.

21. The one or more non-transitory, computer-readable storage media of claim 20, wherein to validate the one or more secure enclave memory pages comprises to statically analyze the one or more secure enclave memory pages.

22. The one or more non-transitory, computer-readable storage media of claim 20, wherein to validate the one or more secure enclave memory pages comprises to verify that each executable secure enclave memory page is not writable.

23. The one or more non-transitory, computer-readable storage media of claim 19, wherein to validate the control flow integrity of the secure enclave comprises to validate an asynchronous exit point associated with an enclave entry instruction.

24. The one or more non-transitory, computer-readable storage media of claim 19, further comprising a plurality of instructions that in response to being executed cause the computing device to share data stored in an untrusted memory buffer between the application image and the secure enclave, wherein the untrusted memory buffer is located outside of the predefined virtual address range.

25. The one or more non-transitory, computer-readable storage media of claim 19, wherein:

to load the application image comprises to load an untrusted application image that is not trusted by an operating system of the computing device; and to validate the control flow integrity of the secure enclave comprises to validate that the untrusted application image does not include an enclave entry instruction.

* * * * *